US012614967B2

(12) United States Patent
Floriani et al.

(10) Patent No.: US 12,614,967 B2
(45) Date of Patent: Apr. 28, 2026

(54) CONTROL DEVICE FOR A SWITCHING VOLTAGE REGULATOR HAVING REDUCED AUDIO NOISE AND CONTROL METHOD

(71) Applicant: STMicroelectronics S.r.l., Agrate Brianza (IT)

(72) Inventors: Ivan Floriani, Milan (IT); Stefano Castorina, Milan (IT); Giulia Altamura, Milan (IT); Emanuele Moretti, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 277 days.

(21) Appl. No.: 18/451,256

(22) Filed: Aug. 17, 2023

(65) Prior Publication Data

US 2024/0088790 A1 Mar. 14, 2024

(30) Foreign Application Priority Data

Sep. 13, 2022 (IT) ........................ 102022000018672

(51) Int. Cl.
H02M 1/00 (2007.01)
H02M 3/158 (2006.01)

(52) U.S. Cl.
CPC ....... H02M 1/0035 (2021.05); H02M 1/0025 (2021.05); H02M 3/158 (2013.01)

(58) Field of Classification Search
CPC .................................................. H02M 1/0035
See application file for complete search history.

(56) References Cited

U.S. PATENT DOCUMENTS

| | | | |
|---|---|---|---|
| 2008/0030178 A1* | 2/2008 | Leonard ................ | H02M 3/156 |
| | | | 323/282 |
| 2014/0160808 A1 | 6/2014 | Sato | |
| 2015/0198634 A1* | 7/2015 | Brinlee .................. | G01R 31/28 |
| | | | 324/72.5 |
| 2015/0318777 A1* | 11/2015 | Pasqua .................... | H02M 1/08 |
| | | | 363/21.13 |
| 2019/0245440 A1* | 8/2019 | Hallikainen .......... | H02M 3/156 |
| 2021/0305888 A1* | 9/2021 | Chen ........................ | H02M 1/08 |
| 2022/0216797 A1* | 7/2022 | Endo ........................ | H02M 1/36 |
| 2024/0322692 A1* | 9/2024 | Zhang ................ | H02M 3/1588 |

OTHER PUBLICATIONS

Lou, Jiana et al.,. "High Efficiency High Integration Green Converter", Integrated Circuit, ISIC '09. Proceedings of the 2009 12th International Symposium on, IEEE, Piscataway, NJ, USA, Dec. 14, 2009, 4 pages.

* cited by examiner

*Primary Examiner* — Gustavo A Rosario-Benitez
(74) *Attorney, Agent, or Firm* — Slater Matsil, LLP

(57) ABSTRACT

A control device for a switching voltage regulator having a switching circuit receives a set of measurement signals including a first measurement signal indicative of an output voltage of the switching voltage regulator. A burst-mode controller is configured to monitor the output voltage with respect to a first threshold and a second threshold higher than the first threshold, and to provide, in response, a burst signal. A driving-signal generation stage is configured to provide at least one switching control signal for the switching circuit based on the burst signal and the set of measurement signals. The driving-signal generation stage has a feedback module configured to provide a control signal based on the burst signal and an error signal indicative of a difference between the first measurement signal and a reference signal.

20 Claims, 7 Drawing Sheets

CONTROL DEVICE FOR A SWITCHING VOLTAGE REGULATOR HAVING REDUCED AUDIO NOISE AND CONTROL METHOD

CROSS-REFERENCE TO RELATED APPLICATIONS

This application claims priority to Italian Application No. 102022000018672, filed on Sep. 13, 2022, which application is hereby incorporated herein by reference.

TECHNICAL FIELD

The present disclosure relates to a control device for a switching voltage regulator having a reduced audio noise and to a control method.

BACKGROUND

As is known, a switching voltage regulator is able to convert a d.c. input voltage into a d.c. output voltage using different operating schemes and may be obtained using different topologies.

FIG. 1 shows a switching voltage regulator 1 comprising a four-switch non-inverting switching circuit, indicated hereinafter as switching circuit 3, and a control device 5.

The switching circuit 3 is formed by a first half-bridge 7, a second half-bridge 9, and an inductor 10.

The first half-bridge 7 is formed by a first high-side switch 11 and by a first low-side switch 13, here two N-MOS transistors, coupled in series between an input terminal 15 and a common node 17.

The common node 17 is coupled to a reference-potential line (ground) 18 via a shunt resistor 19.

Applied to the input terminal 15 is an input voltage $V_{IN}$ with respect to ground 18.

The second half-bridge 9 is formed by a second high-side switch 20 and by a second low-side switch 22, also here two N-MOS transistors, coupled in series between an output node 24 and the common node 17.

An output voltage $V_{OUT}$ drops across an output capacitor 25, between the output node 24 and ground 18, and is applied to a load 26.

The inductor 10 is coupled between an intermediate node of the first half-bridge 7 and an intermediate node of the second half-bridge 9.

By appropriately controlling switching of the first and the second half-bridges 7, 9, it is possible to cause the output voltage $V_{OUT}$ to remain at a desired value, chosen, for example, by a user according to a specific application, irrespective of the value of the input voltage $V_{IN}$.

As a function of the ratio between the input voltage $V_{IN}$ and the output voltage $V_{OUT}$, the switching voltage regulator 1 works in one of three operating modes, also known as buck mode if $V_{IN} > V_{OUT}$, boost mode if $V_{IN} < V_{OUT}$, and buck-boost mode if $V_{IN} \approx V_{OUT}$.

For the purpose of regulating the output voltage $V_{OUT}$ to the desired value, the control device 5 comprises a control circuit 30, which supplies a pulse-width-modulation signal PWM as a function of the output voltage $V_{OUT}$, and a driving circuit 31, which receives the signal PWM and supplies four switch control signals T1, T2, T3, and T4 for the first high-side switch 11, the first low-side switch 13, the second high-side switch 20, and the second low-side switch 22, respectively.

It is equally known to design the control device 5 so that the regulator 1 will work in a low-energy-consumption mode, in which it is desired to reduce as far as possible the events of switching of the switches of the switching circuit 3.

According to one approach, the control device 5 keeps the second high-side switch 20 in an open state, and the control device 5 regulates the output voltage $V_{OUT}$ by controlling switching of the switches 11, 13, and 22.

In this mode, as indicated in FIG. 1, the second high-side switch 20 behaves electrically like a diode 33. Consequently, in use, a current may flow through the inductor 10 towards the output node 24, but may not flow from the output node 24 towards the inductor 10.

This entails that, in use, the output voltage $V_{OUT}$ tends to grow beyond the desired regulation value, in particular in a light-load operating condition, i.e., when the load current through the load 26 has a low value, for example less than some tens of milliamps.

To guarantee proper regulation of the output voltage $V_{OUT}$ within a reference interval, the control device 5 operates in a mode known as burst mode, as illustrated in FIG. 2.

In detail, the control circuit 30 compares the output voltage $V_{OUT}$ with a high output threshold $V_{th,H}$ and a low output threshold $V_{th,L}$.

When the output voltage $V_{OUT}$ reaches the high output threshold $V_{th,H}$, the regulator 1 enters a disabled switching step in which the control circuit 30 disables switching of the switches 11, 13, 20, 22 (signal PWM constant in time).

During the disabled switching step, the output capacitor 25 discharges on the load 26, thus causing a reduction in the output voltage $V_{OUT}$.

When the output voltage $V_{OUT}$ reaches the low output threshold $V_{th,L}$, the regulator 1 enters an enabled switching step in which the control circuit 30 re-enables switching of the switches 11, 13, 20, 22.

During the enabled switching step, the control circuit 31 controls oscillation of the signal PWM between a high value and a low value, causing an increase in the output voltage $V_{OUT}$ towards the high output threshold $V_{th,H}$.

SUMMARY

According to various embodiments of the present disclosure a control device for a switching voltage regulator, a switching voltage regulator, and a control method for a switching voltage regulator are provided.

In at least one embodiment, a control device for a switching voltage regulator is provided. The switching voltage regulator includes a switching circuit. The control device includes a burst-mode controller configured to receive a set of measurement signals including a first measurement signal indicative of an output voltage of the switching voltage regulator and to monitor the output voltage with respect to a first threshold and a second threshold higher than the first threshold. The burst-mode controller is configured to generate a burst signal in response to the monitoring the output voltage with respect to the first threshold and the second threshold. Driving-signal generation circuitry is included and is configured to generate at least one switching control signal for the switching circuit based on the burst signal and the set of measurement signals. The driving-signal generation circuitry includes a feedback circuit configured to generate a control signal based on the burst signal and an error signal. The error signal is indicative of a difference between the first measurement signal and a reference signal.

In at least one embodiment, a switching voltage regulator is provided that includes a control device and a switching circuit. The control device includes a burst-mode controller configured to receive a set of measurement signals including a first measurement signal indicative of an output voltage of the switching voltage regulator and to monitor the output voltage with respect to a first threshold and a second threshold higher than the first threshold. The burst-mode controller is configured to generate a burst signal in response to the monitoring the output voltage with respect to the first threshold and the second threshold. The control device further includes driving-signal generation circuitry configured to generate at least one switching control signal based on the burst signal and the set of measurement signals. The driving-signal generation circuitry includes a feedback circuit configured to generate a control signal based on the burst signal and an error signal. The error signal is indicative of a difference between the first measurement signal and a reference signal. The switching circuit is configured to receive the at least one switching control signal. The switching circuit includes at least one switch configured to be controlled by the at least one switching control signal and has an input node configured to receive an input voltage and an output node configured to provide the output voltage based on the input voltage.

In at least one embodiment, a control method is provided for a switching voltage regulator including a switching circuit and a control device. The control method includes: receiving a set of measurement signals including a first measurement signal indicative of an output voltage of the switching voltage regulator; monitoring the output voltage with respect to a first threshold and a second threshold higher than the first threshold; generating a burst signal in response to the monitoring the output voltage with respect to the first threshold and the second threshold; and generating at least one switching control signal for the switching circuit based on the burst signal and the set of measurement signals. Generating the at least one switching control signal includes generating a control signal based on the burst signal and an error signal, and the error signal is indicative of a difference between the first measurement signal and a reference signal.

BRIEF DESCRIPTION OF THE DRAWINGS

For a more complete understanding of one or more embodiments of the present disclosure, and the advantages thereof, reference is now made to the following descriptions taken in conjunction with the accompanying drawings, in which.

DETAILED DESCRIPTION OF ILLUSTRATIVE EMBODIMENTS

Figure 1:
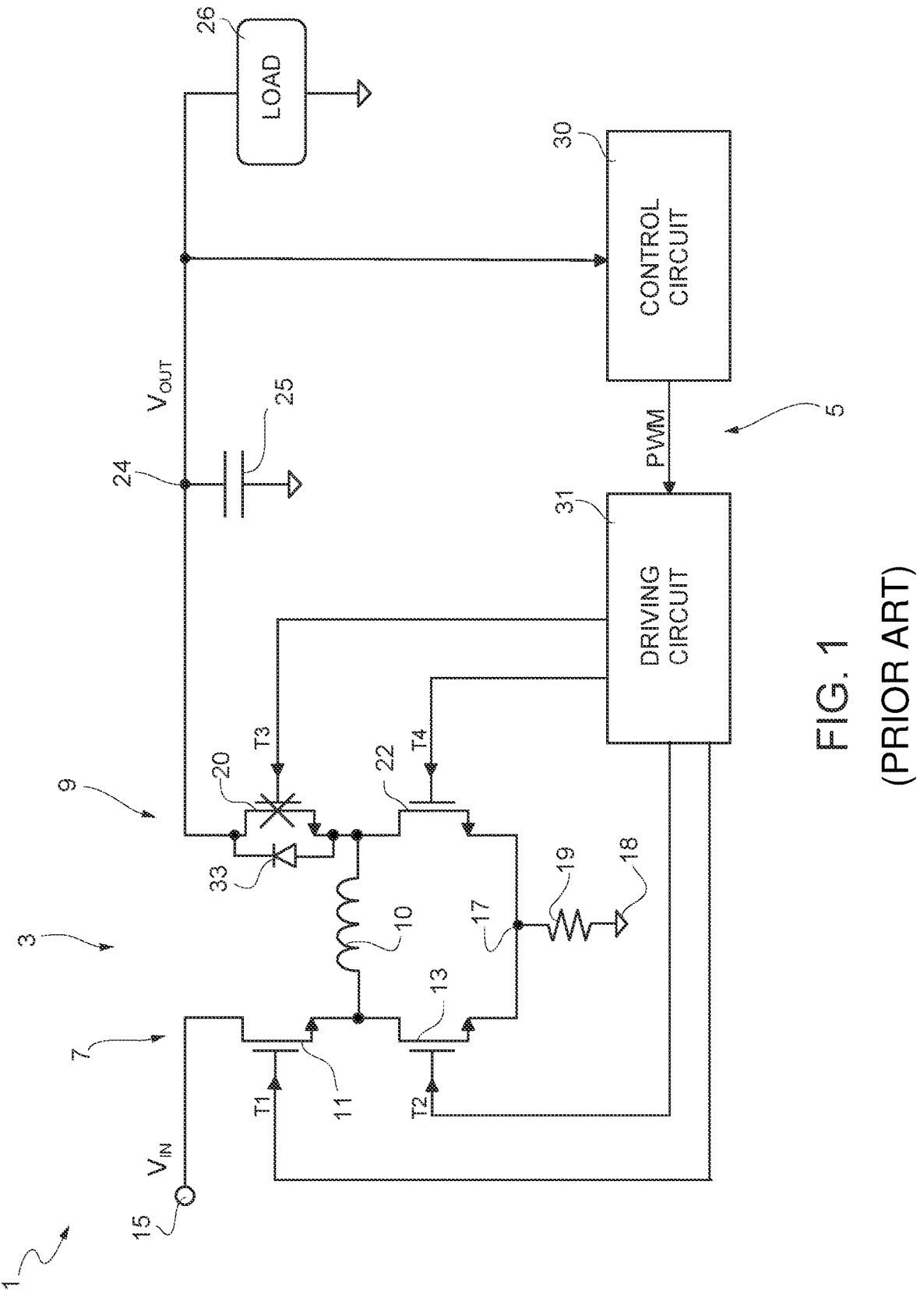
FIG. 1 shows a circuit diagram of a known switching voltage regulator.
Figure 2:
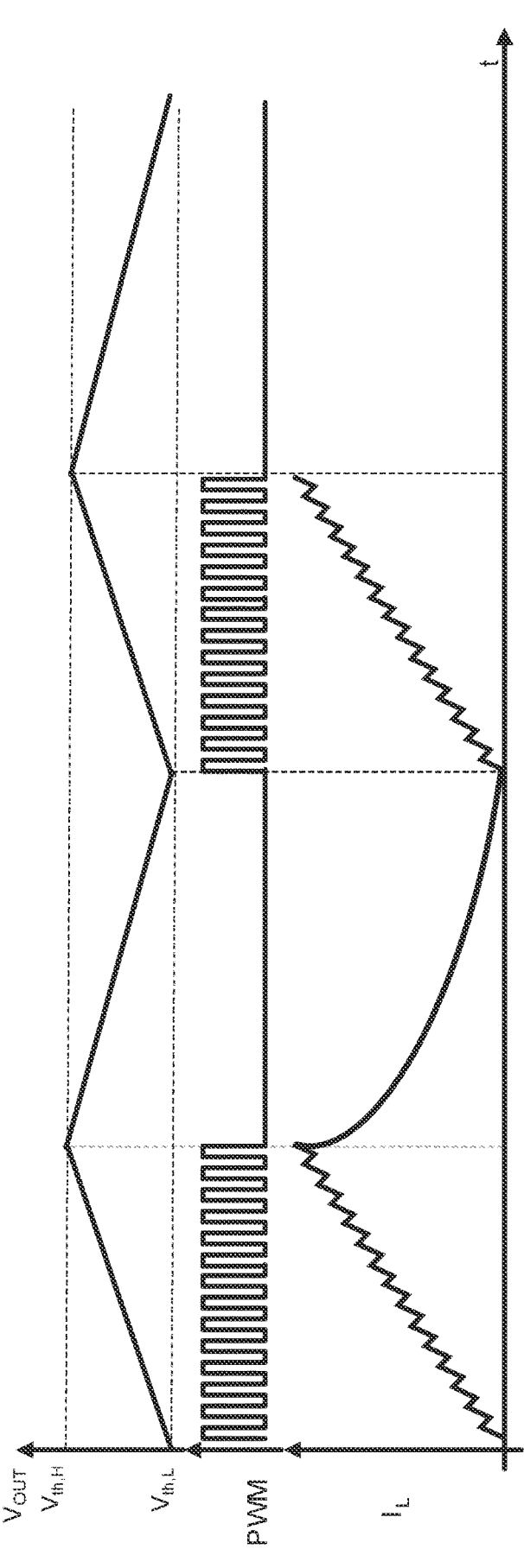
FIG. 2 shows waveforms of the known voltage regulator of FIG. 1, in use.

The present applicant has noted that, with respect to the known switching voltage regulator 1 described with respect to FIG. 1, during the enabled switching period, the current $I_L$ that flows through the inductor 10 tends to rise and may reach high values, for example even up to 20 A, even though the load current through the load 26 is low, for example even though it has a mean value of some milliamps. This may cause malfunctioning or even breakdown of the switching regulator.

Furthermore, the present applicant has noted that the switching voltage regulator 1 generates an undesired audio noise that may be troublesome for a user, for example for a user of an electronic apparatus incorporating the known switching voltage regulator.

One or more embodiments of the present disclosure overcome or at least partially overcome the disadvantages of the prior art, for example as described with respect to FIG. 1.

Figure 3:
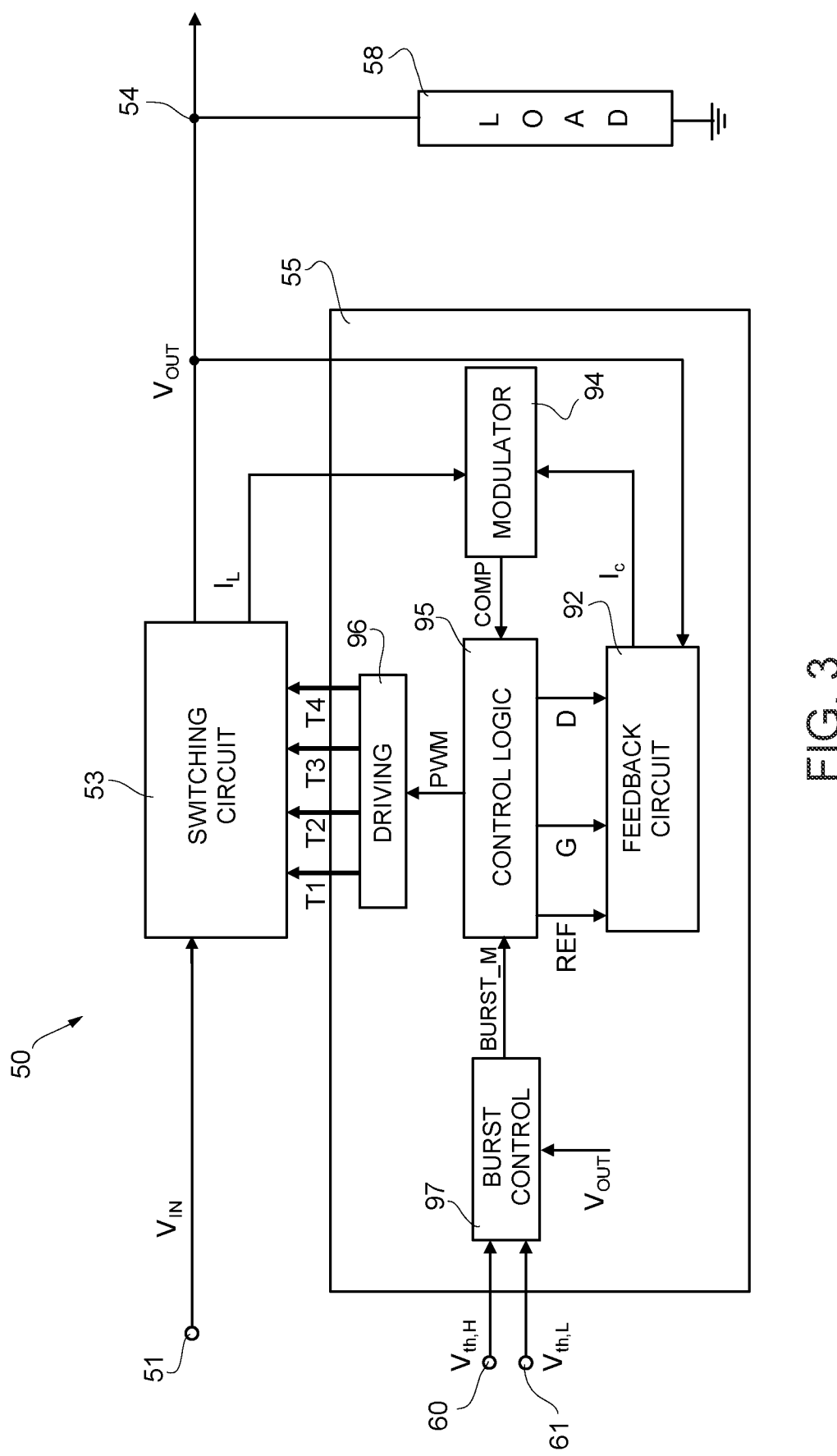
FIG. 3 shows a block diagram of a voltage regulator having a switching circuit and a control device, in accordance with one or more embodiments of the present disclosure.

FIG. 3 shows a block diagram of a switching voltage regulator 50, also referred to hereinafter simply as regulator 50, comprising a switching circuit 53 and a control device 55, mutually coupled.

The regulator 50 has an input node 51 from which it receives an input voltage $V_{IN}$ and an output node 54 to which it supplies an output voltage $V_{OUT}$.

A load 58 is coupled to the output node 54 of the regulator 50.

The regulator 50 further has a first threshold node 60, from which it receives a high threshold voltage, also referred to hereinafter as high output threshold $V_{th,H}$, and a second threshold node 61, from which it receives a low threshold voltage, also referred to hereinafter as low output threshold $V_{th,L}$. The high output threshold $V_{th,H}$ and the low output threshold $V_{th,L}$ may, for example, be chosen by a user as a function of the specific application.

The regulator 50 is a DC-DC converter of the switching type configured to generate the output voltage $V_{OUT}$, starting from the input voltage $V_{IN}$, so that the output voltage $V_{OUT}$ is equal to a desired value, for example chosen by a user.

In detail, the regulator 50 is configured to maintain the output voltage $V_{OUT}$ between the low output threshold $V_{th,L}$ and the high output threshold $V_{th,H}$.

In practice, the regulator 50 is configured to operate in a burst mode, as described in detail hereinafter.

The switching circuit 53 and the control device 55 may be integrated in a same die or formed in different dies.

Figure 4:
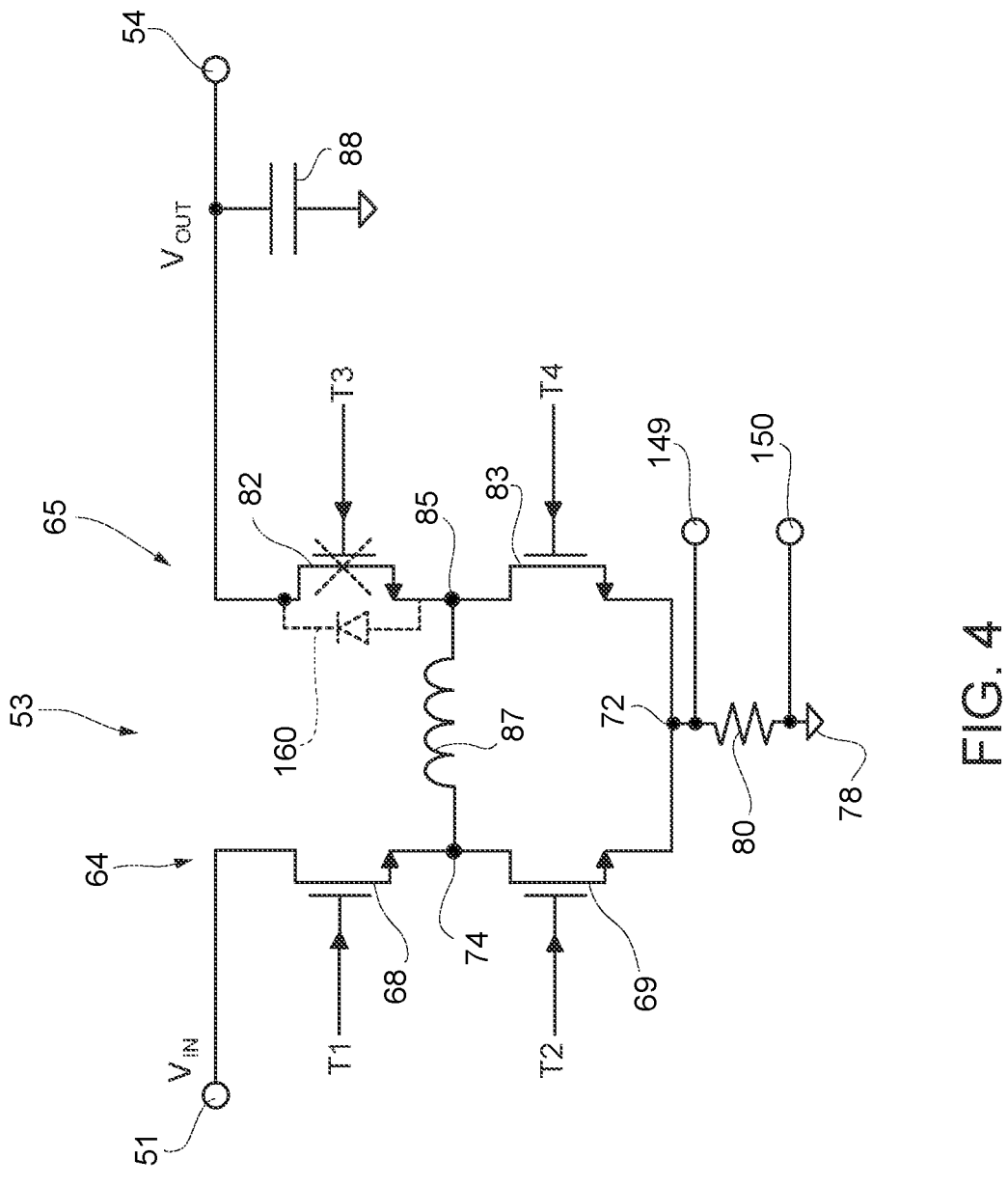
FIG. 4 shows a detailed circuit diagram of the switching circuit of FIG. 3, according to one or more embodiments.

FIG. 4 shows in detail the circuit diagram of one embodiment of the switching circuit 53, here a four-switch non-inverting circuit.

The switching circuit 53 may operate in buck mode, boost mode, or buck-boost mode, according to whether the input voltage $V_{IN}$ is, respectively, greater than, smaller than, and approximately equal to the output voltage $V_{OUT}$.

In detail, the switching circuit 53 is formed by a first half-bridge 64 and a second half-bridge 65.

The first half-bridge 64 is formed by a first high-side switch 68 and by a first low-side switch 69, here two N-MOS transistors, coupled in series between the input node 51 and a common node 72.

In detail, the first high-side switch 68 is coupled between the input node 51 and an intermediate node 74 of the first half-bridge 64, and the first low-side switch 69 is coupled between the intermediate node 74 of the first half-bridge 64 and the common node 72.

The input node 51 is at the input voltage $V_{IN}$ with respect to a reference potential line (ground) 78.

The common node 72 is coupled to ground 78 via a shunt resistor 80 having a resistance $R_S$.

The second half-bridge 65 is formed by a second high-side switch 82 and by a second low-side switch 83, also here two N-MOS transistors, coupled in series between the output node 54 and the common node 72.

In detail, the second high-side switch 82 is coupled between the output node 54 and an intermediate node 85 of the second half-bridge 65, and the second low-side switch 83 is coupled between the intermediate node 85 of the second half-bridge 65 and the common node 72.

The output node 54 is at the output voltage $V_{OUT}$ with respect to ground 78.

The switching circuit 53 also comprises an inductor 87, having an inductance L and coupled between the intermediate node 74 of the first half-bridge 64 and the intermediate node 85 of the second half-bridge 65, and an output capacitor 88, coupled between the output node 54 and ground 78.

The first high-side switch 68, the first low-side switch 69, the second high-side switch 82, and the second low-side switch 83 are each controlled by a respective switch-control signal T1, T2, T3, T4 provided by the control device 55.

Once again with reference to FIG. 3, the control device 55 is coupled to the output node 54, from which it receives the output voltage $V_{OUT}$; the first threshold node 60, from which it receives the high output threshold $V_{th,H}$; and the second threshold node 61, from which it receives the low output threshold $V_{th,L}$.

Furthermore, in the embodiment illustrated, the control device 55 also receives a signal indicating a current $I_L$ that flows, in use, through the inductor 87.

The control device 55 may thus carry out a current control of the switching circuit 53, for example of the peak type or of the valley type.

The control device 55 comprises a loop or feedback control circuit 92, a PWM modulator 94, a logic control circuit 95, a driving circuit 96, and a burst control circuit (or burst-mode controller) 97. The loop control circuit 92, the PWM modulator 94, the logic control circuit 95 and the driving circuit 96 may be collectively referred to as a driving-signal generation stage or driving-signal generation circuitry.

Figure 5:
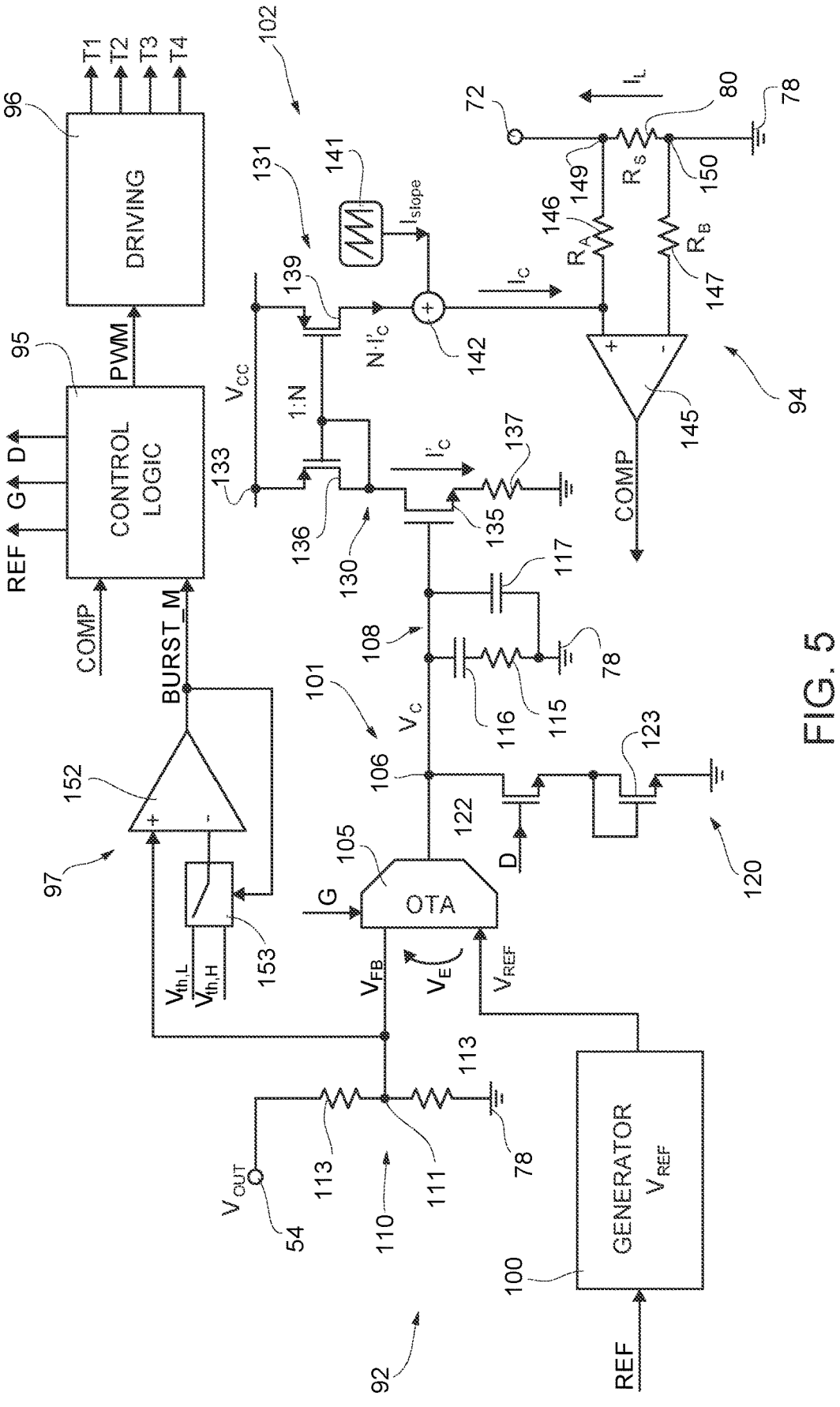
FIG. 5 shows a detailed circuit diagram of the control device of FIG. 3, according to one or more embodiments.

The control device 55 is described hereinafter in detail with reference to the embodiment illustrated in FIG. 5.

The feedback circuit 92 provides a loop control signal, here a control current $I_C$, from an error signal $V_E$ indicative of the difference between the output voltage $V_{OUT}$ and a reference or nominal voltage $V_{REF}$.

In practice, the feedback circuit 92 implements or has a transfer function between the error signal $V_E$ and the control current $I_C$.

Furthermore, the feedback circuit 92 receives a gain signal G and a cycle signal D from the logic control circuit 95, which are configured to modify the transfer function of the feedback circuit 92 in providing the control current $I_C$ from the error signal $V_E$, as discussed in detail hereinafter.

The feedback circuit 92 comprises a reference generator 100, which receives a reference control signal REF from the logic control circuit 95 and, in response, generates the reference voltage $V_{REF}$, as discussed in detail hereinafter.

The feedback circuit 92 further comprises compensation circuitry 101 (which may be referred to herein as a compensation module), coupled to the output node 54, receiving the reference voltage $V_{REF}$ and providing a control voltage $V_C$ as a function of the error signal $V_E$, and voltage-to-current conversion circuitry 102 (which may be referred to herein as a voltage-to-current module), which provides the control current $I_C$ as a function of the control voltage $V_C$.

In detail, the compensation module 101 comprises an error amplifier, here an operational transconductance amplifier (OTA) 105 having an output 1o6, and a compensation network 1o8 coupled to the output 1o6.

The OTA 105 receives the gain signal G, which is configured to set a gain value of the OTA 105.

For instance, the regulator 50 may be configured to work both in the burst mode, as described in detail hereinafter, and in a normal mode, in which the burst-mode controller 97 is disabled. In this case, the logic control circuit 95 may reduce the gain of the OTA 105 when the regulator 50 works in burst mode, with respect to the gain value of the OTA 105 when the regulator 50 works in normal mode. For instance, the logic control circuit 95 may reduce the gain of the OTA 105 when the regulator 50 enters the burst mode.

In this embodiment, the compensation module 101 further comprises a voltage divider 110 coupled between the output node 54 and ground 78.

In detail, the voltage divider 110 has an intermediate node 11 at a feedback voltage $V_{FB}$ and is formed by a series circuit having here two resistors 113 mutually coupled at the intermediate node 111.

The OTA 105 has a first input coupled to the output of the reference generator 100 and a second input coupled to the intermediate node in of the voltage divider 110.

In practice, in this embodiment, the OTA 105 compares the reference voltage $V_{REF}$ with a fraction of the output voltage $V_{OUT}$, according to the resistance values of the resistors 113. However, the OTA 105 may be configured to compare the reference voltage $V_{REF}$ directly with the output voltage $V_{OUT}$.

In this embodiment, the compensation network 108 is of the second order and is coupled between the output 106 of the OTA 105 and ground 78.

In detail, the compensation network 108 is a parallel circuit coupled between the output node 106 and ground 78 and formed by a first branch, comprising a series circuit formed by a compensation resistor 115 and a first compensation capacitor 116, and a second branch comprising a second compensation capacitor 117.

However, the compensation network 108 may be formed by electrical elements different in number and type, according to the specific transfer function desired for the compensation module 101, i.e., to the behaviour of the control voltage $V_C$ as a function of the error signal $V_E$. For instance, the compensation network 108 may be of an order different from the second; for example, it may be of the first order, the third order, or a higher order.

The feedback circuit 92 further comprises a cycle control circuit 120 coupled to the output node 106 of the OTA 105 and configured to set, in use, a defined value of the control voltage $V_C$, irrespective of the value of the output voltage $V_{OUT}$ and of the reference voltage $V_{REF}$.

In detail, in this embodiment, the cycle control circuit 120 comprises a series circuit formed by a first transistor 122 and a second transistor 123, here two MOSFETs of N type.

The first transistor 122 has the drain terminal coupled to the output 106 of the OTA 105 and the source terminal coupled to the drain terminal of the second transistor 123.

The first transistor 122 receives, at the gate terminal, the cycle signal D, which controls the on and off switching thereof.

The source terminal of the second transistor 123 is coupled to ground 78. The gate terminal and the drain terminal of the second transistor 123 are coupled together.

The voltage-to-current conversion module 102 is formed by a first mirror branch 130 and a second mirror branch 131.

The first mirror branch 130 is a series circuit coupled between ground and a supply node 133 at a supply voltage $V_{CC}$, and comprising a first transistor 135, here a MOSFET of N type, a second transistor 136, here a MOSFET of P type, and a control resistor 137.

The gate terminal of the first transistor 135 is coupled to the output 106 of the OTA 105; i.e., it is at the control voltage $V_C$.

The second transistor 136 has the source terminal coupled to the supply node 133 and the gate terminal coupled to the drain terminal.

The first mirror branch 130 generates an intermediate control current $I'_C$, as a function of the control voltage $V_C$.

The second mirror branch 131 comprises a transistor 139, here a MOSFET of P type, having the gate terminal coupled to the gate terminal of the second transistor 136 of the first mirror branch 130 and the source terminal coupled to the supply node 133.

The first and the second mirror branches 130, 131 have a current mirror ratio of 1:N so that the transistor 139 provides a current equal to $N \cdot I'_C$.

The ratio 1:N between the first and the second mirror branches 130, 131 of the voltage-to-current conversion module 102 may be modified by varying the properties of the transistors 136, 139, for example by appropriately sizing the transistors 136, 139 at the design stage.

In this embodiment, the compensation module 102 further comprises a correction circuit, here formed by a ramp generator 141, which generates a ramp current $I_{slope}$.

The feedback circuit 92 comprises an adder node 142 receiving the current $N \cdot I'_C$ output by the transistor 139 and the ramp current $I_{slope}$ and providing at output the control current $I_C$.

The ramp current $I_{slope}$ may be useful, in use, for example, to dampen the phenomenon of sub-harmonic oscillations that may be caused by a perturbation in the inductor current $I_L$.

The PWM modulator 94 compares a quantity indicative of the control current $I_C$ with a quantity indicative of the inductor current $I_L$ and supplies, in response, a comparison signal COMP.

In this embodiment, the PWM modulator 94 is directly coupled to the shunt resistor 80.

In detail, the PWM modulator 94 comprises a comparator 145; a first resistor 146 having a resistance $R_A$, coupled between the positive input of the comparator 145 and a first terminal 149 of the shunt resistor 80, here connected to the common node 72 of the switching circuit 53; and a second resistor 147 having a resistance $R_B$, coupled between the negative input of the comparator 145 and a second terminal 150 of the shunt resistor 80, here connected to ground 78.

The control current $I_C$ may be much lower than the inductor current $I_L$, and the resistances $R_A$, $R_B$ of the first and second resistors 146, 147 may be much higher than the resistance $R_S$ of the shunt resistor 80.

For instance, the control current $I_C$ may be of the order of some microamps, the inductor current $I_L$ may be of the order of some amps, the resistances $R_A$, $R_B$ of the first and the second resistors 146, 147 may be of the order of some kiloohms, and the resistance $R_S$ of the shunt resistor 80 may be of the order of some milliohms.

In the embodiment illustrated, the feedback circuit 92 supplies the control current $I_C$ to the positive input of the comparator 145, for example when the regulator 50 operates in buck mode.

In practice, in buck mode, the comparator 145 may compare the voltage drop $I_C \cdot R_A$ on the first resistor 146 with the voltage drop $I_L \cdot R_S$ on the shunt resistor 80.

However, the control current $I_C$ may be provided to the negative input of the comparator 145, for example when the regulator 50 operates in boost mode.

In practice, in boost mode, the comparator 145 may compare the voltage drop $I_C \cdot R_B$ on the second resistor 147 with the voltage drop $I_L \cdot R_S$ on the shunt resistor 80.

The burst control circuit 97 provides, to the logic control circuit 95, a burst signal BURST_M indicative of the value and/or trend of the output voltage $V_{OUT}$ with respect to the low output threshold $V_{th,L}$ and the high output threshold $V_{th,H}$. In practice, the burst control circuit 97 monitors the output voltage $V_{OUT}$ with respect to the low output threshold $V_{th,L}$ and to the high output threshold $V_{th,H}$.

In detail, the burst control circuit 97 comprises a comparator 152 having a positive input coupled to the intermediate node 11 of the voltage divider 110 of the feedback circuit 92, and a negative input coupled to a threshold switch 153.

The threshold switch 153 is coupled to the output of the comparator 152 and is configured to couple the negative input of the comparator 152 to the high output threshold $V_{th,H}$ or to the low output threshold $V_{th,L}$, as a function of the burst signal BURST_M.

In practice, in the embodiment illustrated, the comparator 152 compares the high output threshold $V_{th,H}$ or the low output threshold $V_{th,L}$ with the feedback voltage $V_{FB}$, i.e., with a fraction of the output voltage $V_{OUT}$. If the value of the resistors 113 of the voltage divider 110 is known, the burst-control circuit 97 is able to monitor the output voltage $V_{OUT}$.

Furthermore, the comparator 152 may compare the high output threshold $V_{th,H}$ or the low output threshold $V_{th,L}$ directly with the output voltage $V_{OUT}$, according to the specific application.

The burst signal BURST_M indicates whether the output voltage $V_{OUT}$ has an increasing trend over time, in particular whether it is increasing from the low output threshold $V_{th,L}$ towards the high output threshold $V_{th,H}$, or whether the output voltage $V_{OUT}$ has a decreasing trend over time, in particular whether it is decreasing from the high output threshold $V_{th,H}$ towards the low output threshold $V_{th,L}$.

Figure 6:
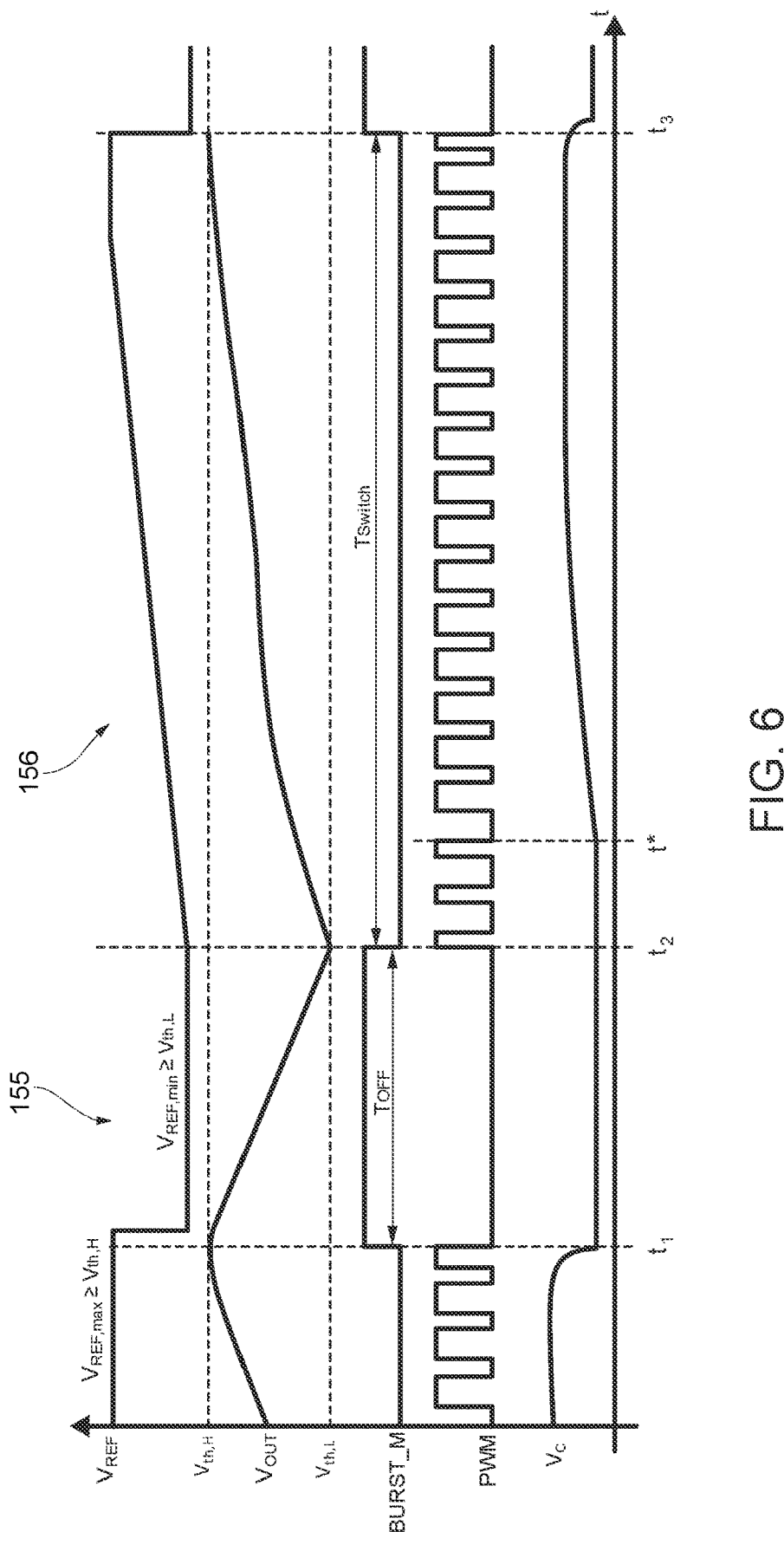
FIG. 6 shows an example of waveforms of the voltage regulator of FIG. 4, in use, according to one or more embodiments.

In this embodiment, as for example illustrated in the waveforms of FIG. 6, the burst signal BURST_M is a logic signal having a low logic value 'o' when the output voltage $V_{OUT}$ increases, and a high logic value '1' when the output voltage $V_{OUT}$ decreases.

In detail, the comparator 152 is configured to switch the burst signal BURST_M to the high logic value when the output voltage $V_{OUT}$ reaches the high output threshold $V_{th,H}$, and to switch the burst signal BURST_M to the low logic value when the output voltage $V_{OUT}$ reaches the low output threshold $V_{th,L}$.

With reference to FIG. 6, when the burst signal BURST_M has the high logic value, the regulator 50 is in a disabled switching step 155 having a duration $T_{OFF}$. When the burst signal BURST_M has the low logic value, the regulator 50 is in an enabled switching step 156 having a duration $T_{switch}$.

Once again with reference to FIG. 5, the threshold switch 153 is configured to couple the negative input of the comparator 152 to the low output threshold $V_{th,L}$ in response to the burst signal BURST_M switching to the high logic value, and to couple the negative input of the comparator 152 to the high output threshold $V_{th,H}$ in response to the burst signal BURST_M switching to the low logic value.

The logic control circuit 95 receives the comparison signal COMP from the PWM modulator 94 and the burst signal BURST_M from the burst control circuit 97 and, in response, provides the modulated signal PWM.

The driving circuit 96 supplies the switch control signals T1, T2, T3, T4, in a per se known manner, starting from the modulated signal PWM, as a function of the current operating mode of the regulator 50, for example according to whether the regulator 50 is in buck mode, boost mode, or buck-boost mode and according to the specific control mode used (for example, current control of a peak type or a valley type).

As illustrated in FIG. 6, when the regulator 50 is in the disabled switching step 155, the modulated signal PWM has a constant value in time.

When the regulator 50 is in the enabled switching step 156, the modulated signal PWM oscillates in time between a high value and a low value.

In the enabled switching step 156, the modulated signal PWM is a square-wave signal having a fixed period and a variable duty cycle.

In detail, the logic control circuit 95 modifies the duty cycle of the modulated signal PWM as a function of the comparison signal COMP, in a per se known manner.

During the disabled switching step 155, the first and the second high-side switches 68, 82 and the first and the second low-side switches 69, 83 do not switch between the open state and the closed state. In other words, during the disabled switching step 155, the state of the first and the second high-side switches 68, 82 and of the first and the second low-side switches 69, 83 remains constant in time.

During the disabled switching step 155, the output voltage $V_{OUT}$ decreases, since the charge in the capacitor 88 may be discharged through the load 58. In other words, during the disabled switching step 155, the output voltage $V_{OUT}$ may be regulated passively, i.e., without energy consumption by the regulator 50.

Instead, during the enabled switching step 156, the first and the second high-side switches 68, 82 and the first and the second low-side switches 69, 83 may switch between the open state and the closed state as a function of the respective switch control signals T1-T4. In practice, during the enabled switching step, the output voltage $V_{OUT}$ may be regulated actively by the control device 55, with consequent energy consumption.

In use, the logic control circuit 95 provides the reference control signal REF so that the reference voltage $V_{REF}$ is variable in time.

In detail, as illustrated in FIG. 6, the logic control circuit 95 is configured to regulate the reference voltage $V_{REF}$ between a minimum value $V_{REF,min}$ and a maximum value $V_{REF,max}$.

The minimum value $V_{REF,min}$ may be higher than or equal to, in particular higher than, the low output threshold $V_{th,L}$. The maximum value $V_{REF,max}$ may be higher than or equal to, in particular higher than, the high output threshold $V_{th,H}$.

For instance, the maximum value $V_{REF,max}$ of the reference voltage $V_{REF}$ may be approximately 5% higher than the high output threshold $V_{th,H}$.

At start of the enabled switching step 156 (instant $t_2$ in FIG. 6), the logic control circuit 95 controls the reference generator 100 so that the reference voltage $V_{REF}$ is equal to the minimum value $V_{REF,min}$.

During the enabled switching step 156, the logic control circuit 95 controls the reference generator 100 so that the reference voltage $V_{REF}$ increases in time up to the maximum value $V_{REF,max}$.

In the embodiment of FIG. 6, the reference voltage $V_{REF}$ has a non-decreasing monotonic behaviour, in particular linear, from the minimum value $V_{REF,min}$ to the maximum value $V_{REF,max}$.

Furthermore, in the embodiment of FIG. 6, the logic control circuit 95 controls the reference generator 100 so that the reference voltage $V_{REF}$ has the minimum value $V_{REF,min}$ during the disabled switching step 155, in particular in response to the burst signal BURST_M switching from the low value to the high value (instant $t_1$ of FIG. 6).

With reference to FIG. 6, during the enabled switching step 156, the logic control circuit 95 keeps the cycle signal D at the high value from the start (instant $t_2$) of the enabled switching step 156 up to an instant t*, which may for example be chosen by a user during an initialization or calibration step of the regulator 50.

Between the instant $t_2$ and the instant t*, the first transistor 122 of the cycle control circuit 120 is on; consequently, the output 106 of the OTA 105 is directly coupled to ground 78 via the transistor 123. Thus, the control voltage $V_C$ has a fixed value, irrespective of the value of the feedback voltage $V_{FB}$ and of the reference voltage $V_{REF}$. In particular, the control voltage $V_C$ has a minimum value.

For instance, when the cycle signal D has the high logic value, the control voltage $V_C$ remains at the gate-to-source voltage of the second transistor 123 of the cycle control circuit 120, for example approximately 0.7 V.

The fact that the control voltage $V_C$ maintains a fixed value, irrespective of the output voltage $V_{OUT}$ and of the reference voltage $V_{REF}$, causes, in the interval $t_2$–t*, the duty cycle of the modulated signal PWM to remain at a minimum value, irrespective of the output voltage $V_{OUT}$ and of the reference voltage $V_{REF}$.

In the embodiment of FIG. 6, the logic control circuit 95 switches the cycle signal D to the high value in response to the burst signal BURST_M switching to the high value (instant $t_1$), i.e., at the start of the disabled switching step 155.

Furthermore, here, the cycle signal D maintains the high logic value for the entire duration of the disabled switching step 155. This allows to avoid using additional timing signals to control the switching of the cycle signal D to the high value and thus simplify the design of the control device 55.

In practice, the feedback circuitry 92 (which may be referred to herein as a feedback module) provides the control voltage $V_C$ as a function both of the error signal $V_E$ and of the burst signal BURST_M.

In greater detail, the reference voltage $V_{REF}$ and/or the transfer function of the feedback circuit 92 may be a function of the burst signal.

In use, the fact that the control device 55 regulates the output voltage $V_{OUT}$ between the low output threshold $V_{th,L}$ and the high output threshold $V_{th,H}$, by alternating the enabled switching step 156 and the disabled switching step 155, allows the regulator 50 to have a low energy consumption and to operate properly even when the load current through the load 58 is low, for example less than few tens of milliamps.

For instance, the regulator 50 may operate in an energy-saving mode wherein the control device 55, during the enabled switching step 156, controls only switching of the first high-side switch 68 and of the first and second low-side switches 69, 83. In practice, as represented in FIG. 4 by a dashed cross, the second high-side switch 82 may be kept always in the open state during the enabled switching step 156. In this case, the second high-side switch 82 behaves, from an electrical standpoint, as a diode 160 (represented by a dashed line in FIG. 4), which enables a passage of current only from the inductor 87 to the output node 54 and not from the output node 54 to the inductor 87.

The fact that the control voltage $V_C$ is a function both of the error signal $V_E$ and of the burst signal BURST_M allows the control device 55 to control accurately the behaviour of the inductor current $I_L$; for instance, it allows to maintain the inductor current $I_L$ below a desired maximum value during the enabled switching step 156, the desired maximum valued being chosen, for example, at the design stage according to the specific application.

In detail, the Applicant has found that regulation of the reference voltage $V_{REF}$ during the enabled switching step 156 and/or the possibility of modifying the transfer function of the feedback circuit 92, in particular the possibility of modifying the gain of the OTA 105 via the gain signal G and of setting a fixed value of the control voltage $V_C$ by the cycle control circuit 120, allows to avoid, in use, the occurrence of high peaks in the inductor current $I_L$, even when the load current through the load 58 is low, for example lower than few tens of milliamps.

The Applicant has found that this enables to reduce the likelihood of the regulator 50 to generate noise in the audio band.

The Applicant has in fact noted that high peaks of the inductor current $I_L$ could cause vibrations in the inductor 87, for example due to magnetostriction phenomena, and thus lead to generation of audio noise.

In practice, the regulator 50 may have both a low energy consumption and a reduced likelihood of generating noise in the audio band as compared to known regulators.

Figure 7:
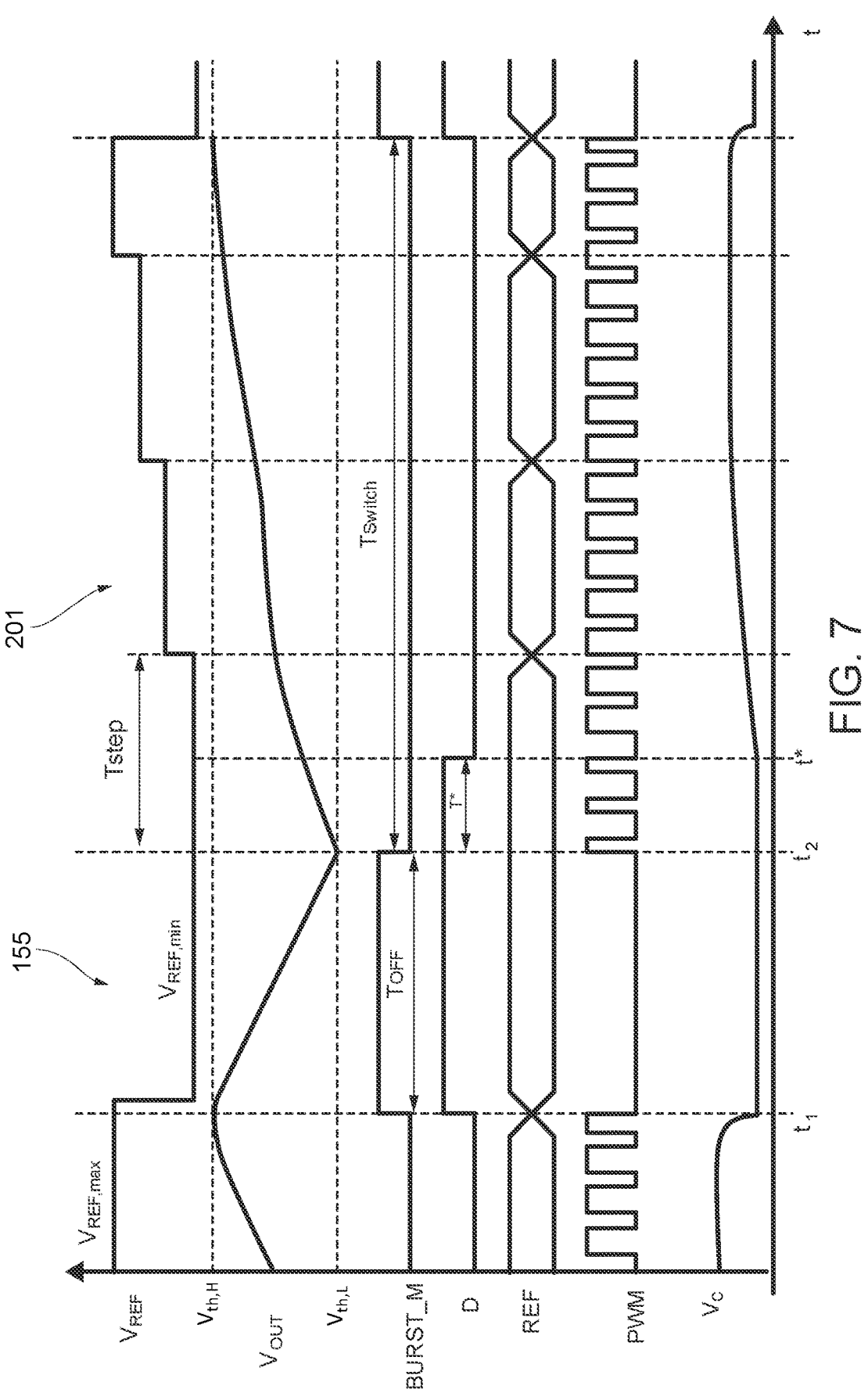
FIG. 7 shows an example of waveforms of the voltage regulator of FIG. 4, in use, according to one or more embodiments.

FIG. 7 shows a further example of waveforms of the regulator 50, in use. According to the embodiment of FIG. 7, the reference voltage $V_{REF}$ has, during the enabled switching step, here designated by 201, a step-like behaviour between the minimum value $V_{REF,min}$ and the maximum value $V_{REF,max}$.

In detail, the reference generator 100 may provide a plurality of discrete voltage values, here four voltage values, comprised between the minimum value $V_{REF,min}$ and the maximum value $V_{REF,max}$.

In this embodiment, the reference control signal REF is a counter signal that selects one of the voltage values that the reference generator 100 may provide.

Furthermore, in the embodiment of FIG. 7, the reference control signal REF modifies the value of the reference voltage $V_{REF}$ at regular intervals. In practice, each step of the reference voltage $V_{REF}$ has a duration $T_{step}$ that may be chosen at the design stage for example as a function of the specific application, of the number of steps and of the switching frequency of the modulated signal PWM.

However, the steps of the reference voltage $V_{REF}$ may have durations different from one another, according to the specific application.

The time interval T* between the instants $t_2$ and t*, during which the cycle signal D maintains the high logic value, may have a duration chosen as a function of the duration $T_{step}$. For instance, the interval T* may be shorter than the duration $T_{step}$, in particular equal to one half of the duration $T_{step}$. In this way, it is possible to guarantee that the duty cycle of the modulated signal PWM remains at the minimum value during an initial step of the enabled switching step 201. This helps to obtain a gradual increase of the inductor current $I_L$ during the enabled switching step 201.

In particular, in the case where the steps of the reference voltage $V_{REF}$ have durations different from one another, the time interval T* may be equal to one half of the first step of the reference voltage $V_{REF}$ subsequent to the instant $t_2$.

The step-like behaviour illustrated in FIG. 7 allows to avoid peaks of the inductor current $I_L$ during the enabled switching step 201, as discussed with reference to FIG. 6, and at the same time allows to simplify the design of the control device 55.

Finally, it is clear that modifications and variations may be made to the control device 55 and to the regulator 50 described and illustrated herein, without thereby departing from the scope of the present disclosure.

For instance, the gain signal G may modulate the gain value of the compensation module 101, in particular of the OTA 105, according to whether the regulator 50 is in the enabled switching step 156 or in the disabled switching step 155. In addition or as an alternative, the gain signal G may modulate the gain value of the compensation module 101 during the enabled switching step 156.

In practice, the logic control circuit 95 may modify the gain of the feedback module 92 as a function of an operating mode of the regulator 50, in particular as a function of the burst signal BURST_M.

For instance, the switching circuit 53 may have a topology different from the one illustrated in FIG. 4; for example, the switching circuit may be a two-switch circuit configured to operate only in buck mode or only in boost mode, of an asynchronous type, or configured to detect a reversal of the inductor current when operating in a discontinuous current mode (DCM).

The regulator 50 may be a switching voltage regulator configured to operate only in buck mode or only in boost mode, or else may be a switching regulator of a different type.

For instance, the regulator 50 may operate in a variable-frequency mode, in which the modulated signal PWM, in the enabled switching step, does not have a fixed period.

For instance, the voltage-to-current conversion module 102 of the feedback circuit 92 may comprise a current-limited mirror, so that the control current $I_C$ supplied at output is lower than or equal to a maximum value, which may be chosen as a function of a desired maximum current through the switching circuit 53.

For instance, the control device may detect the inductor current $I_L$ directly from one of the switches of the switching circuit, in particular in the case where the control device and the switching circuit are integrated in a same die. In practice, in this solution, the switching circuit may not comprise a dedicated shunt resistor, and the PWM modulator may use the ON-state resistance of one of the switches of the switching circuit as resistive element for detecting the current that flows in the switching circuit, in particular through the inductor. This enables further reduction of the energy consumption of the present regulator.

Alternatively, the control device may be configured to perform a voltage control of the switching circuit. In this configuration, the feedback circuit does not comprise the voltage-to-current conversion module, and the control device is configured to modify the duty cycle of the modulated signal PWM directly starting from the control voltage $V_C$, in response to the comparison between the output voltage $V_{OUT}$ and an internal reference voltage.

The feedback circuit 92, the PWM modulator 94, the logic control circuit 95, the driving circuit 96 and the burst control circuit 97 are circuits (or circuit modules) that may be provided as analog circuits, digital circuits, or mixed-signal circuits. Furthermore, these modules may be obtained using totally or in part a software solution, via dedicated computer programs.

The embodiments described and illustrated herein may be combined to form further solutions.

What is claimed is:

1. A control device for a switching voltage regulator, the switching voltage regulator including a switching circuit, the control device comprising:

a burst-mode controller, the burst-mode controller being configured to:

receive a set of measurement signals including a first measurement signal in a set of measurement signals received by the control device, the first measurement signal indicative of an output voltage of the switching voltage regulator, and to monitor the output voltage with respect to a first threshold and a second threshold higher than the first threshold, and generate a burst signal in response to the monitoring the output voltage with respect to the first threshold and the second threshold; and driving-signal generation circuitry configured to:

generate at least one switching control signal for the switching circuit based on the burst signal and the set of measurement signals, the driving-signal generation circuitry including a feedback circuit configured to generate a control signal based on the burst signal and an error signal, the error signal indicative of a difference between the first measurement signal and a reference signal, regulate the reference signal between a minimum value and a maximum value in response to the output voltage reaching the first threshold, and modify the reference signal from the maximum value to the minimum value in response to the output voltage reaching the second threshold.

2. The control device according to claim 1, wherein the driving-signal generation circuitry is configured to modify the reference signal based on the burst signal.

3. The control device according to claim 1, wherein the reference signal is a non-decreasing monotonic signal between the minimum value and the maximum value.

4. The control device according to claim 1, wherein the feedback circuit implements a transfer function between the error signal and the control signal, the driving-signal generation circuitry being configured to modify the transfer function of the feedback circuit based on the burst signal.

5. The control device according to claim 1, wherein the feedback circuit comprises compensation circuitry configured to generate a control voltage based on the error signal and having a gain, the driving-signal generation circuitry being configured to modify the gain of the compensation circuitry based on an operating mode of the switching voltage regulator.

6. The control device according to claim 1, wherein the feedback circuit comprises a cycle control circuit configured to set the control signal to a fixed value, in response to the output voltage reaching the first threshold, irrespective of the error signal.

7. The control device according to claim 1, wherein the set of measurement signals includes a second measurement signal indicative of a current that flows in the switching circuit and wherein the control signal is a control current, the driving-signal generation circuitry further including a modulator configured to compare the control signal with the second measurement signal and, in response, to generate a comparison signal, the at least one switching control signal being based on the burst signal and the comparison signal.

8. A switching voltage regulator, comprising:

a control device, including:

a burst-mode controller configured to:

receive a set of measurement signals including a first measurement signal indicative of an output voltage of the switching voltage regulator, monitor the output voltage with respect to a first threshold and a second threshold higher than the first threshold, and generate a burst signal in response to the monitoring the output voltage with respect to the first threshold and the second threshold; and driving-signal generation circuitry configured to:

generate at least one switching control signal based on the burst signal and the set of measurement signals, the driving-signal generation circuitry including a feedback circuit configured to generate a control signal based on the burst signal and an error signal, the error signal indicative of a difference between the first measurement signal and a reference signal, regulate the reference signal between a minimum value and a maximum value in response to the output voltage reaching the first threshold, and modify the reference signal from the maximum value to the minimum value in response to the output voltage reaching the second threshold; and a switching circuit configured to receive the at least one switching control signal, the switching circuit including at least one switch configured to be controlled by the at least one switching control signal and having an input node configured to receive an input voltage and an output node configured to provide the output voltage based on the input voltage.

9. The switching voltage regulator according to claim 8, wherein the switching voltage regulator is at least one of a buck type, a boost type, or a buck-boost type.

10. The switching voltage regulator according to claim 8, wherein the driving-signal generation circuitry is configured to modify the reference signal based on the burst signal.

11. The switching voltage regulator according to claim 8, wherein the reference signal is a non-decreasing monotonic signal between the minimum value and the maximum value.

12. The switching voltage regulator according to claim 8, wherein the feedback circuit implements a transfer function between the error signal and the control signal, the driving-signal generation circuitry being configured to modify the transfer function of the feedback circuit based on the burst signal.

13. The switching voltage regulator according to claim 8, wherein the feedback circuit comprises compensation circuitry configured to generate a control voltage based on the error signal and having a gain, the driving-signal generation circuitry being configured to modify the gain of the compensation circuitry based on an operating mode of the switching voltage regulator.

14. A control method for a switching voltage regulator including a switching circuit and a control device, the control method comprising:

receiving a set of measurement signals including a first measurement signal indicative of an output voltage of the switching voltage regulator;

monitoring the output voltage with respect to a first threshold and a second threshold higher than the first threshold;

generating a burst signal in response to the monitoring the output voltage with respect to the first threshold and the second threshold;

generating at least one switching control signal for the switching circuit based on the burst signal and the set of measurement signals, wherein generating the at least one switching control signal comprises generating a control signal based on the burst signal and an error signal, the error signal indicative of a difference between the first measurement signal and a reference signal;

regulating the reference signal between a minimum value and a maximum value in response to the output voltage reaching the first threshold; and modifying the reference signal from the maximum value to the minimum value in response to the output voltage reaching the second threshold.

15. The control method according to claim 14, wherein generating the control signal comprises at least one of modifying the reference signal based on the burst signal or modifying a transfer function between the control signal and the error signal based on the burst signal.

16. The control method according to claim 15, wherein modifying the transfer function between the control signal and the error signal comprises at least one of modifying a gain value of the transfer function or setting the control signal to a fixed value in response to the output voltage reaching the first threshold, irrespective of the error signal.

17. The control method according to claim 14, wherein the switching circuit comprises at least one switch controlled by the at least one switching control signal, the at least one switching control signal being configured to enable switching of the at least one switch in response to the output voltage reaching the first threshold and for inhibiting switching of the at least one switch in response to the output voltage reaching the second threshold.

18. The control method according to claim 14, wherein the reference signal is a non-decreasing monotonic signal between the minimum value and the maximum value.

19. The control method according to claim 14, further comprising:

generating a control voltage based on the error signal and having a gain; and modifying the gain based on an operating mode of the switching voltage regulator.

20. The switching voltage regulator according to claim 8, wherein the feedback circuit comprises a cycle control circuit configured to, in response to the output voltage reaching the first threshold, set the control signal to a fixed value irrespective of the error signal.

* * * * *